INVENTORS
EUGENI ESTREMS
MAURICE PAPO
BY [signature]
AGENT

INVENTORS
EUGENI ESTREMS
MAURICE PAPO
BY James A. Ruth
AGENT

INVENTORS
EUGENI ESTREMS
MAURICE PAPO
BY James A. Kurth
AGENT

July 3, 1962 E. ESTREMS ETAL 3,042,903

MEANS FOR TRANSFERRING INFORMATION BETWEEN PLURAL MEMORY DEVICES

Filed Jan. 15, 1957 11 Sheets-Sheet 9

INVENTORS
EUGENI ESTREMS
MAURICE PAPO
BY James A. Ruth
AGENT

INVENTORS
EUGENI ESTREMS
MAURICE PAPO
BY James A. Kurth
AGENT 3,042,903

MEANS FOR TRANSFERRING INFORMATION BETWEEN PLURAL MEMORY DEVICES

Eugeni Estrems, Saint Mande, and Maurice Papo, Paris, France, assignors to International Business Machines Corporation, New York, N.Y., a corporation of New York Filed Jan. 15, 1957, Ser. No. 634,284
3 Claims. (Cl. 340—172.5)

This invention relates generally to means for transferring data and it specifically relates to a device for transferring information data from a first memory device to another one or to a plurality of other memories or devices. The invention is useful in those cases where it is necessary to selectively transfer, at certain steps of a program, information data contained in predetermined positions of the first memory device.

In partial data transfer devices conventionally used in electronic computing machines, the entire contents of the memory is scanned and the selection of the information data to be transmitted is performed by control circuits acting to block the flow of the information data not to be transmitted. This process generally results in a wasted extension in the time of data transfer. Additionally, in the case of magnetic core memories, if the readout erases the information it is indispensable to later rewrite the said information in the memory.

This invention has for its principal object transfer means operable to avoid these drawbacks and is characterized in that during a partial transfer, only that selected data contained in predetermined parts of the whole memory is read out.

Another object of the invention resides in the provision of novel means adapted to scan a memory by the use either of a single or the combination of a plurality of scanning matrices.

Yet another object of the invention resides in the provision of scanning matrices comprising multicontact electromagnetically operated switches or relays where each relay is energized during a scanning cycle for selecting predetermined sections of a memory device.

Another object of this invention resides in the provision of a single pulse emitting chain for simultaneously reading out information data contained in a predetermined part of the memory and for entering this data, thus selected in a second memory device.

Another object of the invention resides in the provision of means for entirely emptying the contents of a memory device by repetitively and sequentially selecting predetermined memory sections for read-out.

The objects and advantages of this invention will become apparent from the following description relating to an example of embodiment applicable to supply data to a printing device for a calculator. It will be assumed that the said first memory is of such a size that it will contain all the information data required for defining a plurality of characters to be printed on a line. The printing device, which forms no part of this invention, comprises a plurality of typebars, the number of which is lower than the number of characters to be printed on a line. This being the case, the printing is performed in successive cycles; for example, if a printed line comprises 120 characters and if there are 9 typebars, the printing of the line will be performed in 14 separate cycles. On the first cycle 9 typebars will simultaneously print the 1st, 15th, 29th . . . 113th characters. At the end of the 1st cycle the typebar assembly will be shifted by one character position, and at the 2nd cycle the typebars will print the 2nd, 16th, 30th . . . 114th characters, the process being repeated until the 14th cycle. It will be apparent that in the chosen example, the last typebar will print nothing during the last 6 cycles. At the beginning of each cycle the elements of the part of the first memory defining the 9 characters to be printed during the cycle are transferred into the second memory associated with the print device. The print is performed, which causes the second memory to be emptied, and the machine is ready for the next cycle.

In the following text, the term "machine cycle" is defined as the interval of time required for a complete transfer of the first memory into a second memory. The term "print cycle" is defined as the interval of time required for a partial transfer, a use of the transferred data (printing) and erasure of the second memory. In the chosen example, one machine cycle comprises 14 print cycles. Terminology aside, the invention should not be construed as being limited to those cases where simple data transfers are used for printing operations. The invention relates to all partial transfers and successions of partial transfers, whether this succession covers all of the information stored in the first memory or not. It will be apparent that the term "memory" must be taken in its general sense and thus is not limited to transient storage devices useful in computing machines and designed for buffering information data to be later transmitted to counters or printing devices, but can be applied to these devices themselves. Thus, for example, one would not depart from the scope of this invention, if the read pulses of the first memory, instead of being sent, as it is in the described example, to a thyratron memory, would be applied directly to the typebars. In this case the typebars themselves would define, by their positions, the characters to be printed and thereby would form the second memory.

Other objects of the invention will be pointed out in the following description and claims and illustrated in the accompanying drawings, which disclose, by way of examples, the principle of the invention and the best mode, which has been contemplated, of applying that principle.

FIGS. 5*d* through 5*h* represent waveforms.

Figure 6:
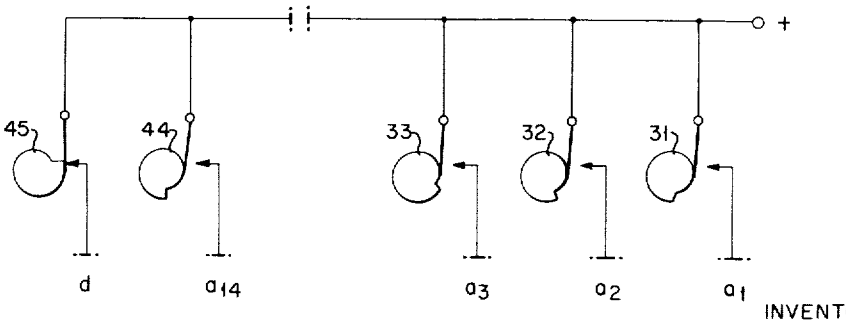
Figure 7:
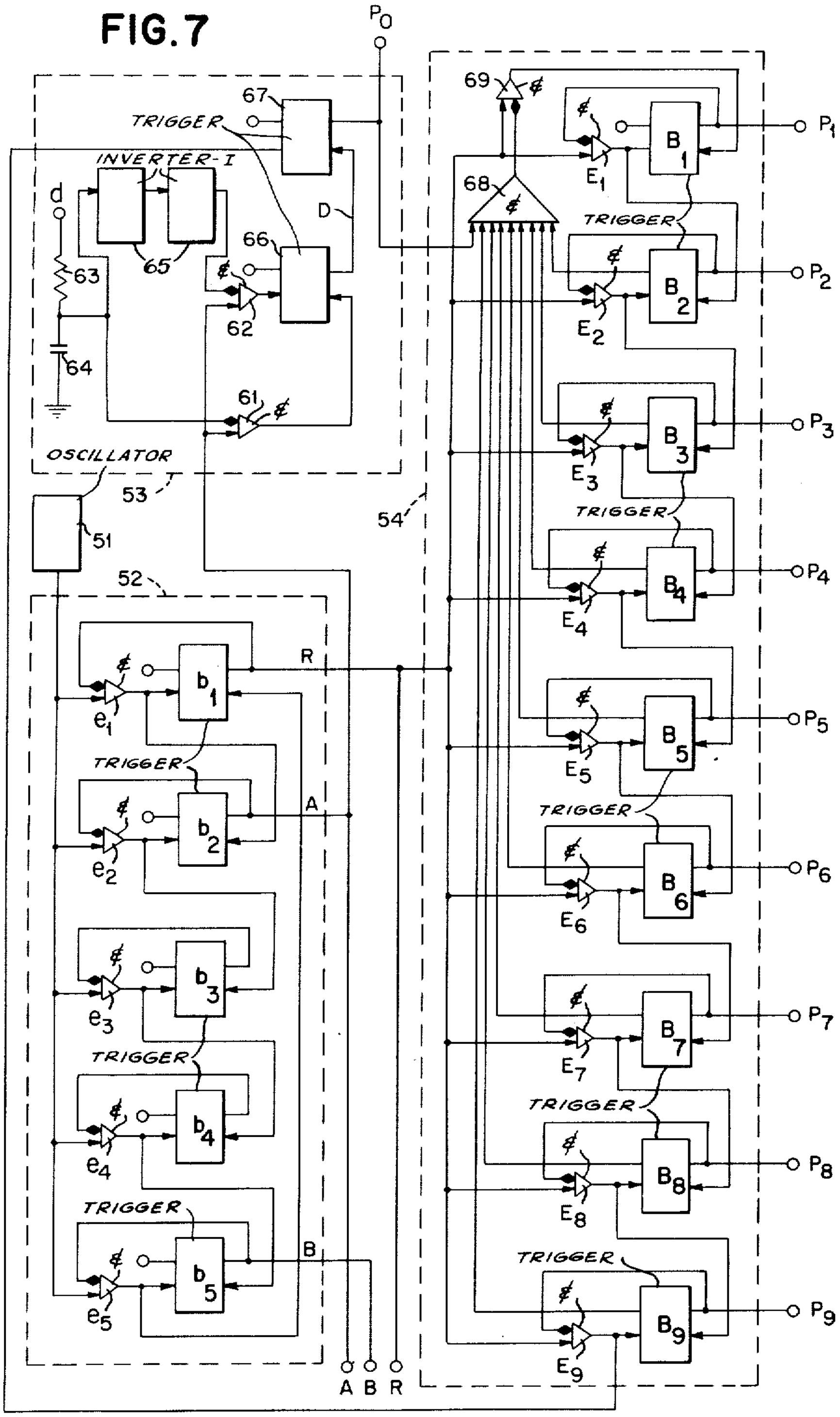
Figure 8:
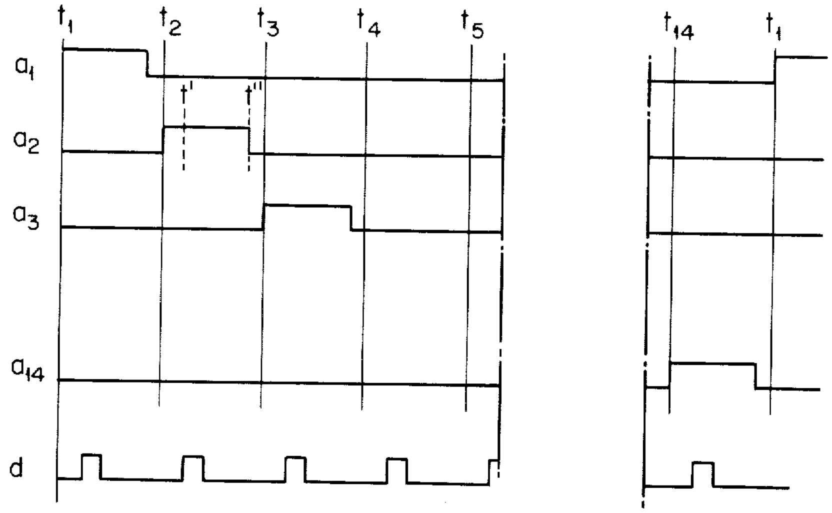

FIGS. 6, 7 and 8 represent timing circuits.

Figure 9:
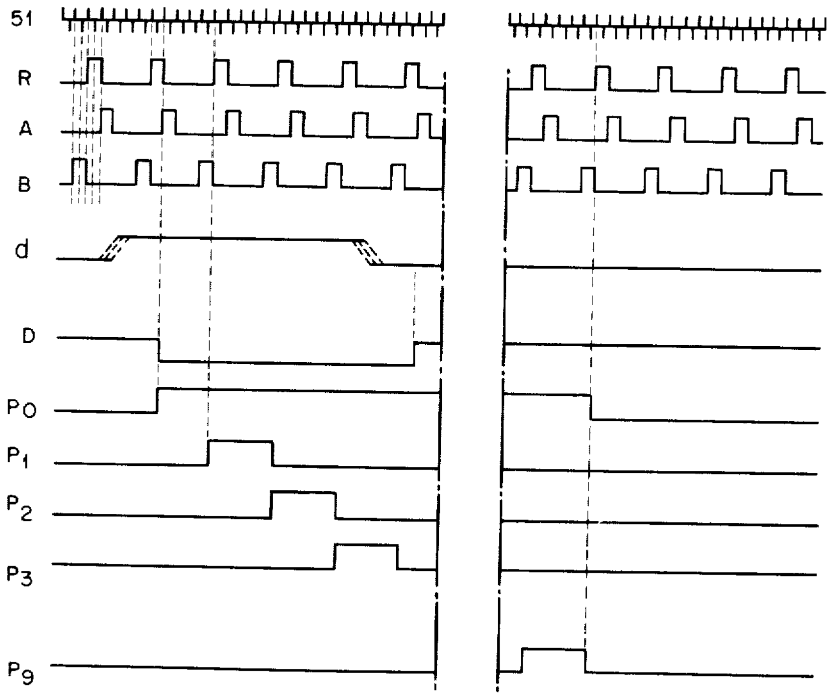
Figure 10:
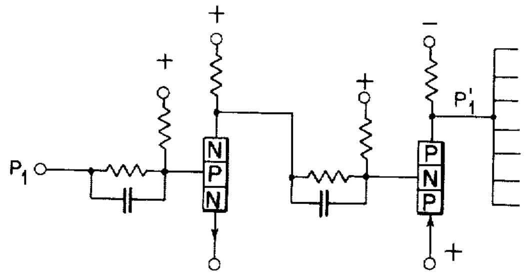

FIGS. 9 and 10 show a chronological diagram of the timing pulses.

FIGS. 11 to 15 show scanning circuits.

Figure 16:
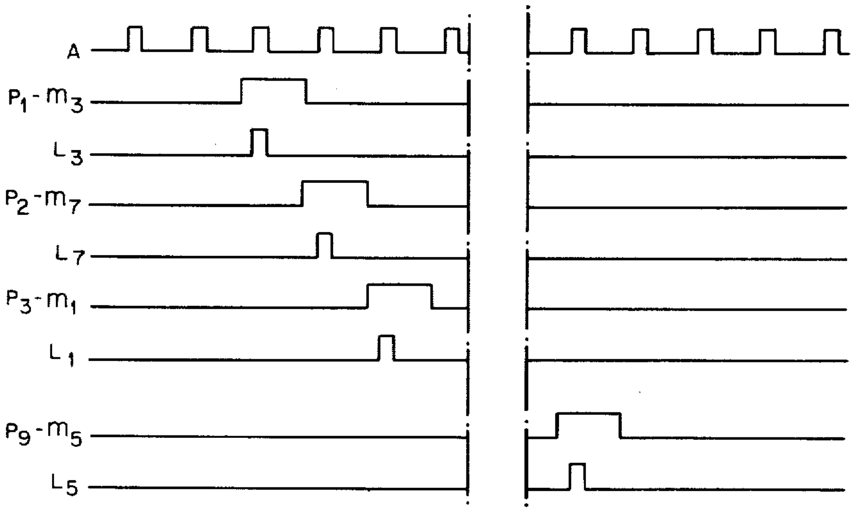

FIG. 16 represents a time diagram of the scanning pulses.

Figure 17:
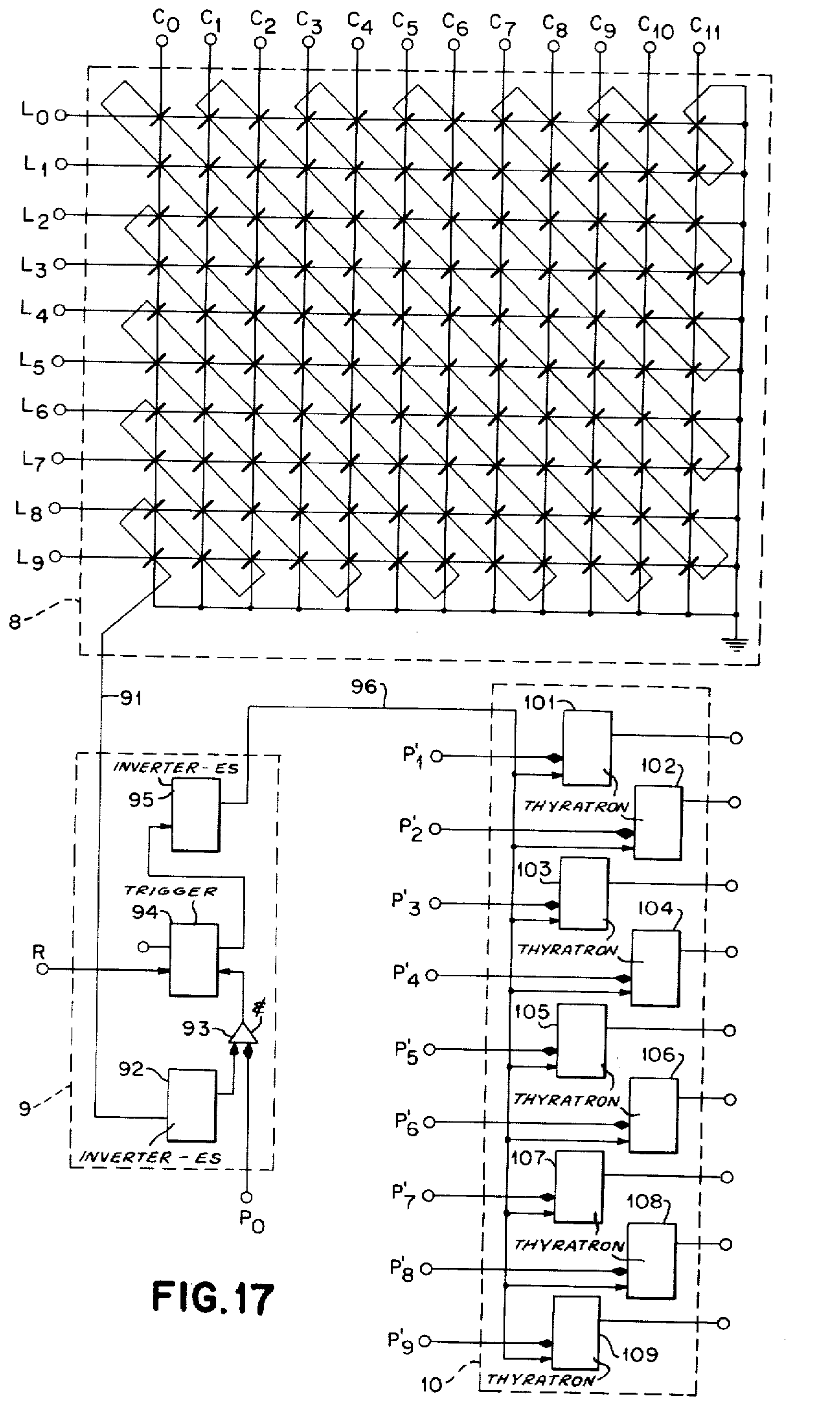

FIG. 17 shows reading and output circuits.

Figure 18:
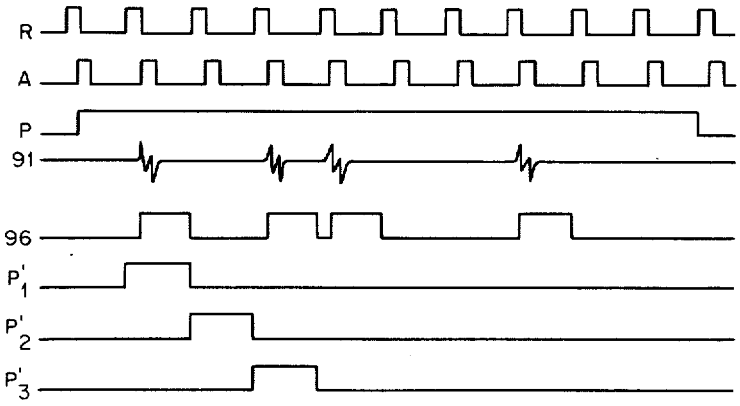

FIG. 18 shows a time diagram of the reading and output pulses.

Figure 11:
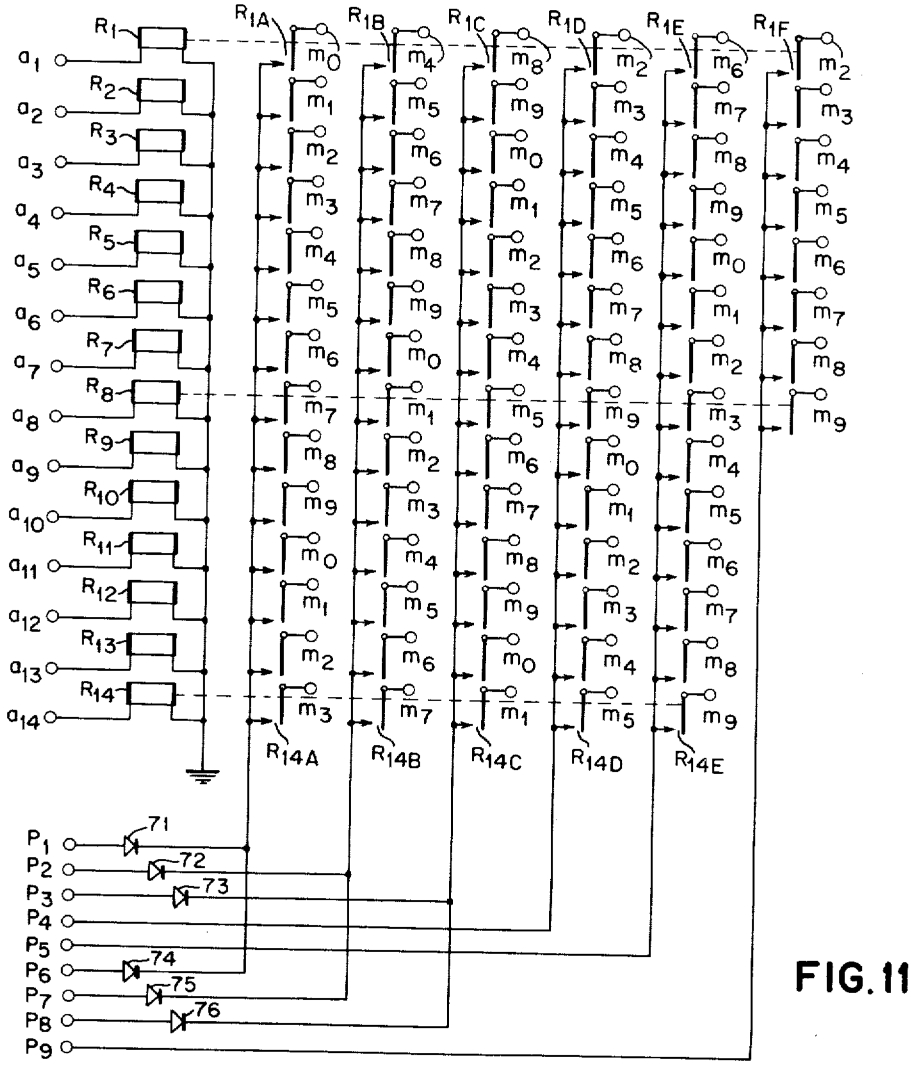
Figures 12, 13:
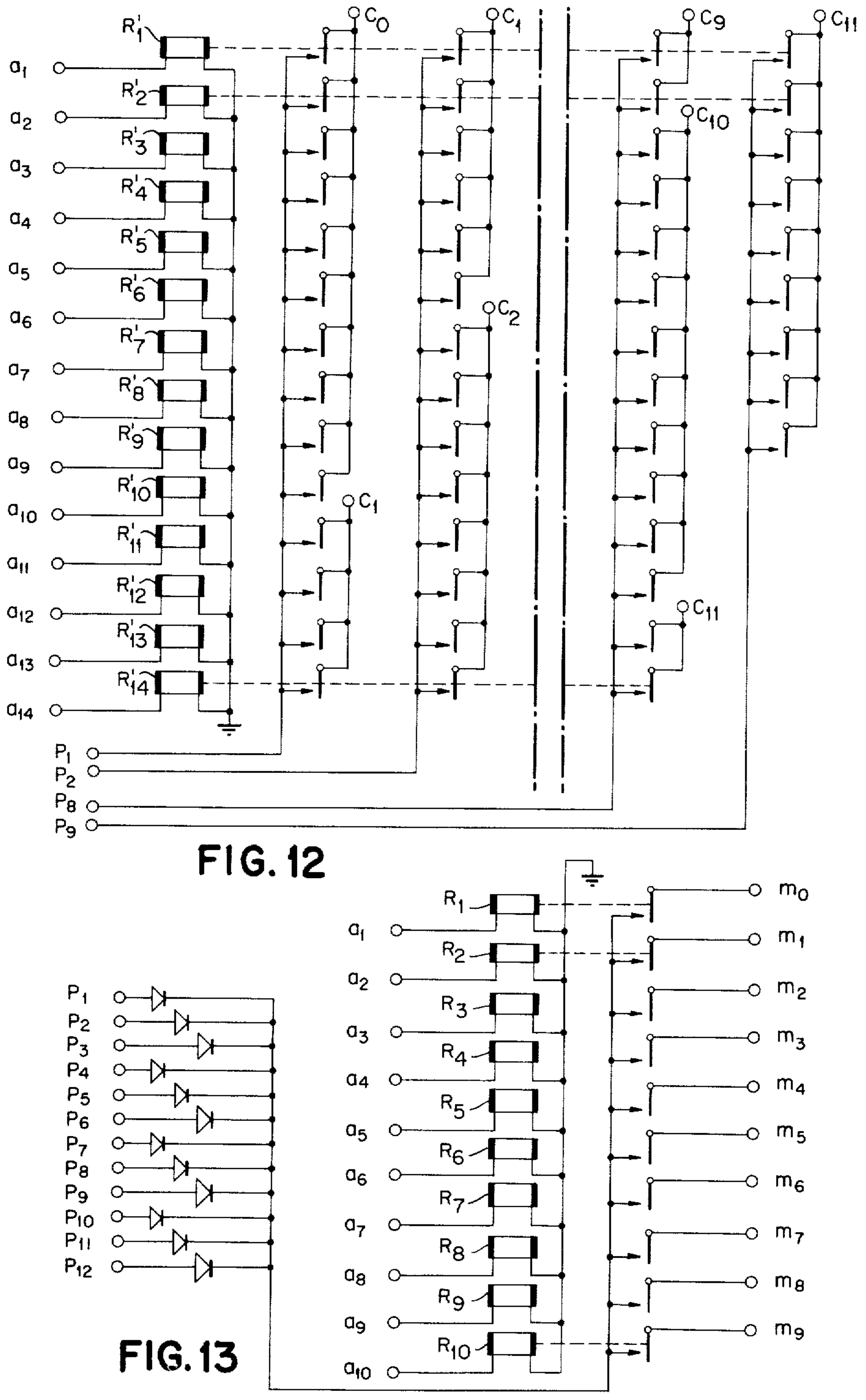
Figure 14:
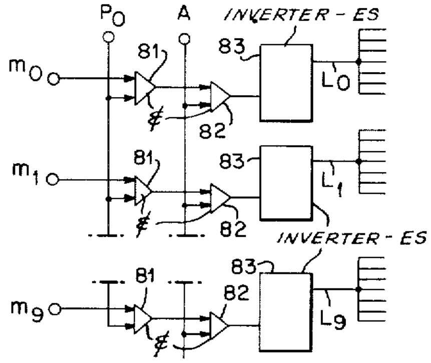
Figure 15:
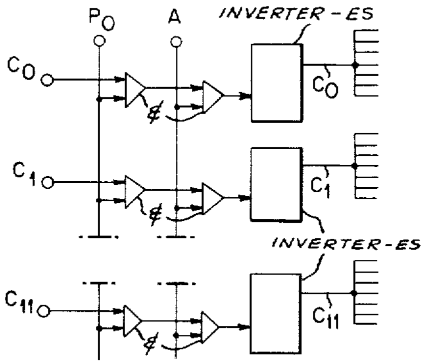
Figure 19:
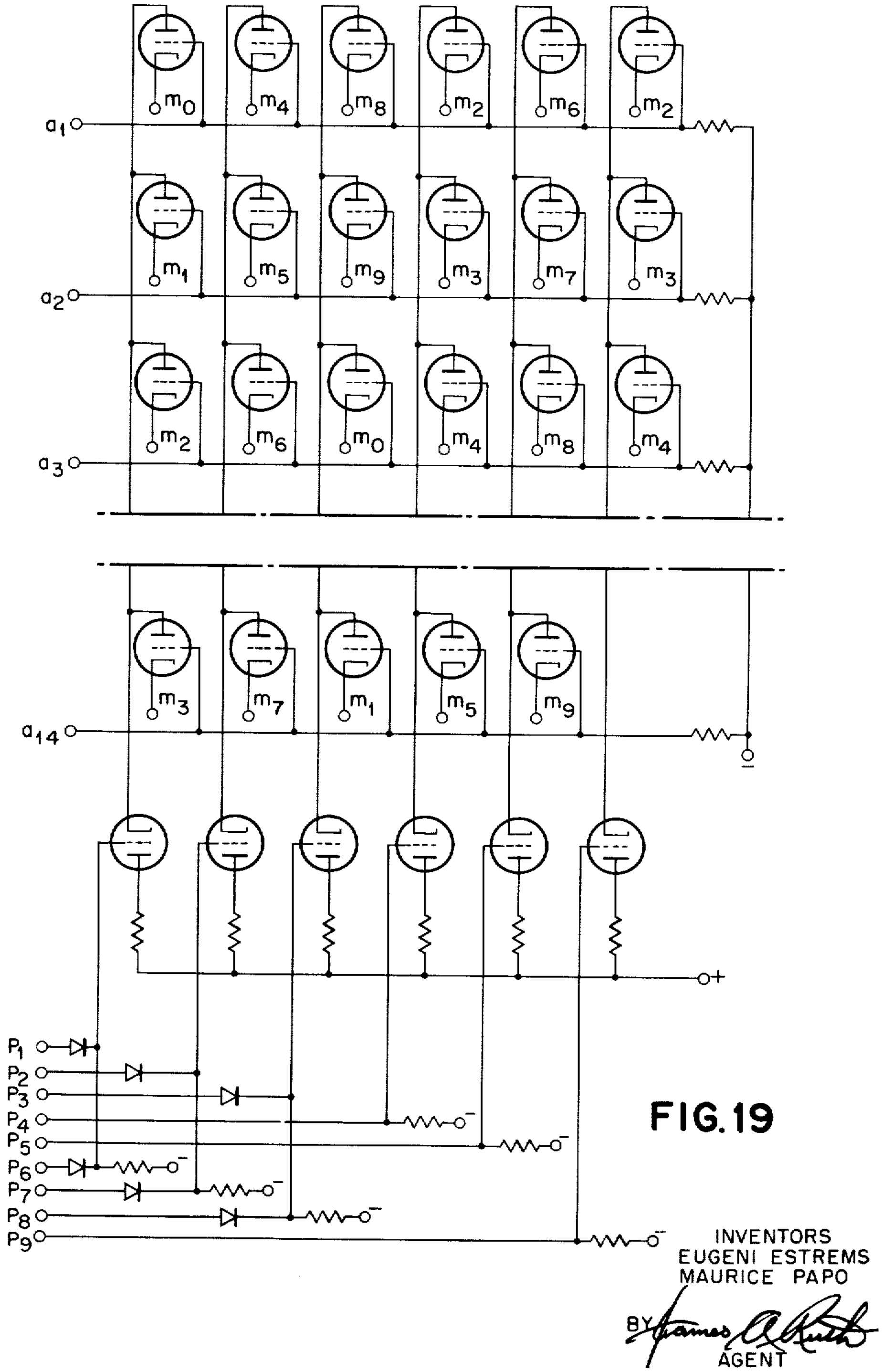

FIG. 19 shows a scanning matrix which is comparable with that of FIG. 11, and is an alternative embodiment of the invention.

Figures 6, 7, 10, 11, 12, 14, 15, 17, 20:
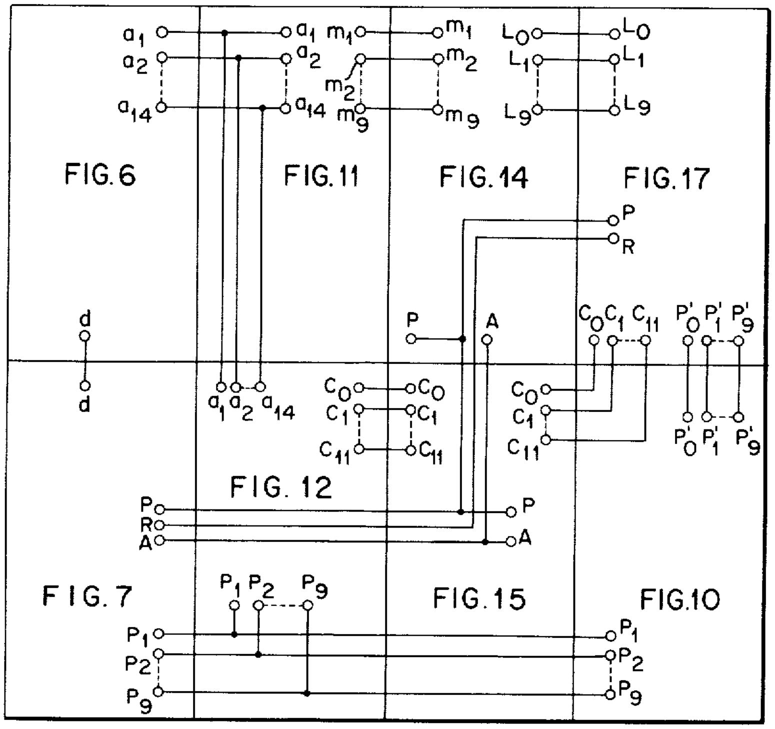

FIG. 20 is an assembly diagram showing interconnections between FIGS. 1, 7, 10, 11, 12, 14 15 and 17.

*General Description*

Figure 1:
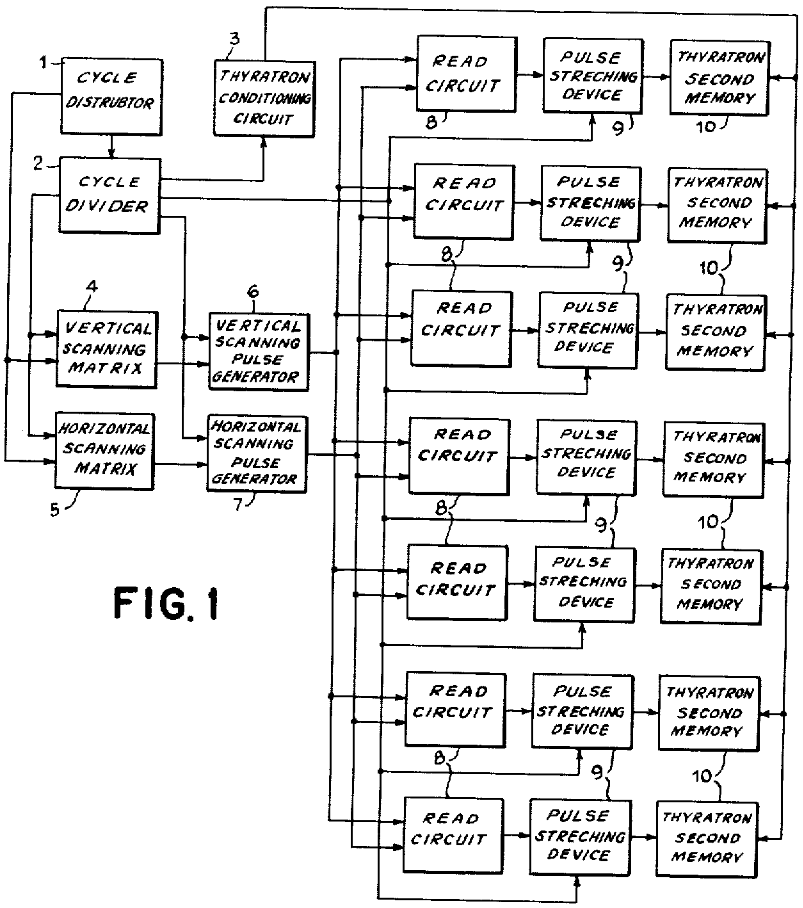
FIG. 1 shows a general block diagram of the device.

The whole assembly of the device, diagrammatically shown in FIG. 1, comprises:

A. A timing section incorporating a cycle distributor 1, a cycle divider 2, and a thyratron conditioning circuit 3.

B. A scanning section comprising a vertical scanning matrix 4, a horizontal scanning matrix 5, a vertical scanning pulse generator 6 and a horizontal scanning pulse generator 7.

C. A memory reading section. In the described device there are 7 read sections all operating in parallel. Each section is associated with one of 7 core planes (or arrays) of a magnetic core memory in which is stored all of the information data to be transferred (each core plane corresponds to one of the 7 binary elements used to define a character). Each of the 7 read sections comprises a read circuit 8 and a pulse stretching device 9.

D. Output sections, comprising thyratron second memories 10 each of which is associated with one of the read sections C.

This invention is adapted to be used in conjunction with a printing device of the type which is disclosed in a copending application of H. S. Beattie, et al., Serial No. 555,026 filed on December 23, 1955. In summary, this application discloses a printing mechanism comprising a single type element having numeric, alphabetic and special characters engraved thereon. Carriage mechanism is provided for advancing the print element, column-by-column across a paper carriage. The printing mechanism here contemplated is provided with 9 separate type elements as above explained thereby providing for a greatly increased speed of printing.

Before proceeding with the description of the various blocks, some details are given herebelow on the basic component circuits.

*Component Circuits*

Before proceeding with a detailed description of the various circuits, a brief description of representative ones of the various circuit units utilized in the invention will be given. It will be noted in the various circuit drawings that the individual units making up each circuit, are indicated as a box which is labeled according to the particular type of unit that is represented.

*Amplifiers and inverters.*—Amplifiers and inverters as contemplated in this invention utilize circuits employing solid state device such as transistors rather than high vacuum tubes.

Figure 2A:
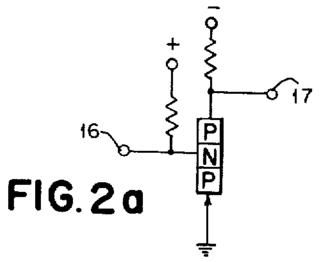
FIGS. 2 to 5 represent the basic circuits used in various parts of the device.

FIG. 2*a* shows a diagram of an amplifier-inverter in which the collector serves as the output, constructed as a P-N-P transistor. In the following diagrams such an inverter is represented in a simplified manner, as shown in FIG. 2*b*, by a box labeled inverter–I. Input 16 is represented in the lower left part, and output 17 in the upper right part.

Figure 2C:
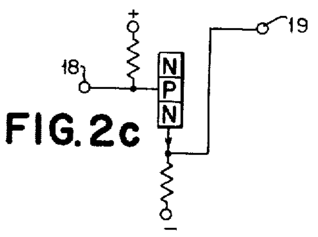
Figure 2B:
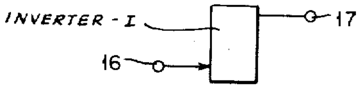
Figure 2D:
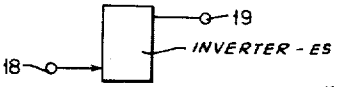

FIG. 2*c* represents the diagram of an emitter-follower amplifier in which the emitter serves as the output. In this embodiment the use of an N-P-N transistor is contemplated. In the following diagrams an inverter such as this is represented in a simplified manner, as shown in FIG. 2*d*, by a rectangle labeled inverter–$E_s$. Input 18 is indicated in the lower left part, and ouput 19 in the upper right part. This circuit is used to obtain power amplification rather than a voltage amplification.

*Triggers.*—The triggers used are bistable circuits having two outputs, both stable states being characterized by a high potential condition at these outputs. In one of these states, conventionally called the "rest condition," the first output (the left output) is at a high potential, and the second output (the right output) is at a low potential. In the other state called the "operation condition" the left ouput is at a low potential, whereas the right output is at a high potential. An input corresponds to each output. The application of a negative pulse with sufficient amplitude at the input corresponding to the low potential output, or that of a positive pulse with sufficient amplitude at the input corresponding to the high potential output, causes the trigger to change from one state to the other.

Figure 3A:
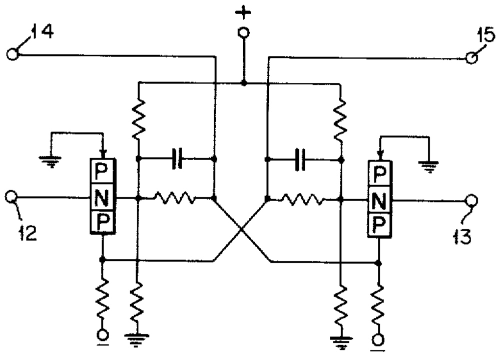
Figure 3B:
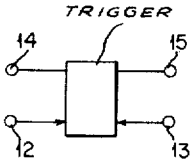

The triggers may be constructed in various ways, and the circuit contemplated in this invention takes the form of a transistorized circuit as is shown in FIG. 3*a*. In the figures of this description the triggers are represented, as shown in FIG. 3*b*, by a rectangle designated trigger, inputs 12 and 13 being represented on the sides at the lower part, and outputs 14 and 15 above.

Figure 4A:
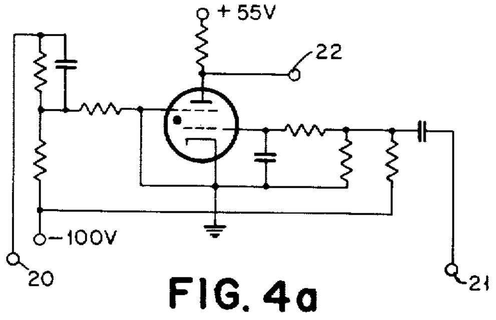

*Thyratrons.*—The thyratrons provided for use in the embodiment of this invention are two-grid thyratrons of the 2 D 21 type. The circuit in which these thyratrons are used is shown in FIG. 4*a*. Both grids normally are biased by a voltage of −100 v. and ignition of the thyratron requires the presence of a pulse of at least the bias potential to be applied to both grids.

Figure 4B:
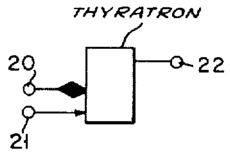

The thyratron and their circuits are represented in a simplified manner, as shown in FIG. 4*b*, by a rectangle designated thyratron. Both inputs 20 and 21 are shown in the lower left part and ouput 22 on the upper right side. If one of the grids receives an advance conditioning voltage enabling ionization to develop as soon as a shorter voltage pulse is applied to the second grid, that fact is indicated by a diamond placed in proximity to the input on which the conditioning voltage is applied, i.e. input 20 in FIG. 4*b*.

Figure 5A:
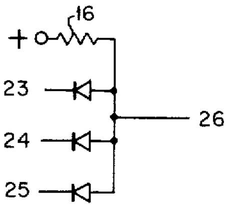

*"AND" circuits.*—An AND circuit is constructed, as shown in FIG. 5*a*, by a number of diodes (three in the case of the figure) having separate inputs 23, 24, 25, and a common ouput 26. The diodes are constructed to conduct in output-input sense. Common output 26 is connected through resistor 16 voltage more positive than the normal potential of the inputs. The potential of the common output, therefore, is equal substantially to that of the input with a lower potential so that if all inputs normally have the same potential, a positive pulse will be transmitted to the output only if it is applied to all the inputs at the same time.

Figure 5B:
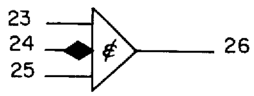

AND circuits are shown in a simplified manner by the diagram of FIG. 5*b*, which is indicated by a triangle enclosing an ampersand sign. The ampersand sign throughout the drawings is used to indicate AND circuits. In the case of an AND circuit with two inputs, where one receives in advance a conditioning positive pulse capable of producing an output pulse as a shorter pulse arrives at the other input, this is represented by a diamond placed in proximity to the input on which the conditioning voltage, as is shown in FIG. 5*b*.

*Diode gate.*—An AND diode gate (FIG. 5*c*) comprises two inputs 27 and 28 connected to a common point 29. The first input is connected through a resistor 17 and the second through a capacitor 18. Common point 29 is connected to common output 30 of the gate through a diode which is considered to be conducting in the input-output direction.

Figure 5C:
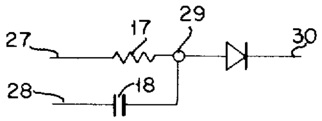
Figure 5D:

If the potential of input 27 is maintained at zero level the application of a square positive pulse at input 28 will cause a voltage variation at point 29, shown by curve in FIG. 5*d*, and comprising a positive peak corresponding to the leading edge of the signal and a negative peak corresponding to the trailing edge (curve representing the result of the differentiation of the signal by the capacitor 18 and the resistor 17). As the diode operates to clip the negative portion, only the positive portion of the signal will appear at point 30.

Figure 5E:
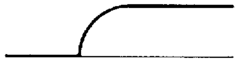

If, in the absence of a signal at 28, a positive voltage is applied to 27, this voltage will set up progressively at 29, the assembly of the resistor-capacitor 17—18 serving as an integrating circuit, and the potential at 30 will follow the potential at 29 as represented in FIG. 5*e*.

Figure 5F:

If, at the same time, two square positive signals of the same amplitude are applied, one to 27 and the other to 28, the voltage at 29 immediately will take a value common to the voltages at 27 and 28, and the situation will be the same for the voltage at 30. The subsequent variation of the voltages at 29 and 30 will depend on the relative position in the time of the trailing edge of the two signals, but these voltages never will overshoot the common amplitude (FIG. 5*f*).

On the other hand, if a positive conditioning voltage is applied in advance at 27, and if the capacitor 18 has been charged, then when a square positive signal is also applied to 28, a voltage is developed at 29 having a peak value which will be substantially the sum of the amplitudes of the two signals. The shape of the curve representing the voltage at 29 is given in FIG. 5*g*, assuming that the signal voltage applied to 28 ceases before the second signal is applied to 27. The voltage at 30 will, of course, be identical to that at 29.

If the output 30 is biased it is possible to cause the gate to pass only voltage variations exceeding the bias voltage level. Hence, if the output is biased at a level equal to that of the amplitude of the signals applied to 27 and 28, in the case just mentioned, a voltage is obtained at output 30 which is represented by the curve in FIG. 5*h*. In all the other cases there is no voltage variation. Thus the gate, in this case, serves the purpose of a conditioned AND circuit, that is, an AND circuit in which the output signal requires not only the simultaneous existence of two signals at the input, but also the applicaton of one of these signals prior to the other.

Figure 5I:
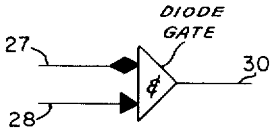
Figure 5G:
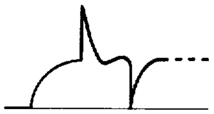
Figure 5H:
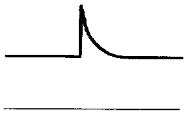

The signal appearing at 30 may be directed, through a capacitor, to one of the inputs of a trigger. If the various bias voltages are so adjusted that the peak voltage developed in the case shown in FIG. 5*g* or 5*h* are such as to cause a change of state, then it will be seen that the switching requires the following conditions:

(*a*) Previous development of a signal at 27.

(*b*) Application of a signal at 28 before the end of the signal directed to 27, but after the voltage at 29 has reached a value close to that of the voltage at 28.

The time of the switching, in this case, will correspond to the rise time of the leading edge of the signal impressed upon 28. It will also be apparent that a negative signal could be applied to 28 instead of a positive signal. Then it would be the peak corresponding to the fall time of the trailing edge of the signal that causes the desired effect.

In the following description, the diode AND gates of FIG. 5*c* are shown in a simplified manner in the diagram of FIG. 5*i*, the diamond corresponding to the input upon which the first or conditioning signal must be applied.

For convenience, this input is designated by the term "slow input" and the term "fast input" designates that to which the second signal is directed.

*Print Cycle Distributor*

During a machine cycle, the print cycle distributor (FIG. 6) successively connects 14 circuits to a positive voltage source, the break of each circuit preceding the make of the next one, and each such circuit is thus connected to the source during the major part of one of the 14 print cycles.

The print cycle distributor comprises 14 cams, 31 through 44, each of which closes the potential feed of one of these 14 circuits. These cams are mechanically driven by the machine through devices not shown, and complete one revolution per machine cycle. Corresponding circuits are designated respectively $a_1$ through $a_{14}$.

A 15th cam 45, which completes one revolution per cycle, connects circuit *d* to a positive voltage source during a part of each cycle. Circuit *d* serves the purpose of starting the operation of the print cycle divider.

*Print Cycle Divider*

The print cycle divider (see FIG. 7) comprises:

(*a*) An oscillator 51

(*b*) Primary chain 52

(*c*) Starting device 53

(*d*) Scanning chain 54

*The oscillator.*—Oscillator 51 provides high frequency oscillations of the order of 250 kilocycles. These oscillations are transformed through differentiating circuits into a pulse series in which the pulses are alternately positive and negative going.

*Primary chain.*—The primary chain 52 is a ring counter comprising 5 triggers, $b_1$ through $b_5$, and 5 AND circuits $e_1$ through $e_5$. Each AND circuit receives at one of its inputs the output of oscillator 51, and at the other the right output of the trigger designated by the same reference subscript. The output of each AND circuit is simultaneously directed to the left input of the corresponding trigger and to the right input of the next trigger. The output of AND circuit $e_5$ is directed to the left input of $b_5$ and to the right input of $b_1$.

At any given moment assume that trigger $b_1$ is On. Then the first pulse from oscillator 51 passes through circuit $e_1$ (the second input connected to the right output of $b_1$ being at that moment at a high potential), and is applied at the same time to the left input of $b_1$, as well as to the right input of $b_2$, causing $b_1$ to assume the Off stable state and $b_2$ to flip to the On condition. The order of the trigger being On advances by one unit through the chain for each positive pulse received from oscillator 51. The switching of $b_5$ to Off is accompanied by that of $b_1$ to On. Pulses produced at the right outputs of triggers $b_1$ and $b_2$ are labeled, respectively, pulse R (or reset pulse) and pulse A (or read pulse). Pulses R and A are used for the timing of other circuits to be described hereafter. Pulses are also produced from the right output of trigger $b_5$ and are labeled B pulses (or write pulses). These pulses may be used for reading without deletion, as will be seen later on.

*Starting device.*—Starting device 53 comprises two AND circuits 61 and 62, both receiving A pulses at one of their respective inputs. The second input of 61 is connected to circuit *d* in FIG. 6, for the purpose of receiving advance conditioning pulses as provided by circuit breaker 45, during part of each print cycle. Resistors 63 and capacitor 64 serve the purpose of eliminating transient oscillations which could develop at the moment when the cam contact makes. The second input of 62 is connected to the output of a pair of inverters 65 in series, the input to the pair of series inverters connected to circuit *d*. The outputs of 61 and 62, respectively, are connected to the right and left inputs of a trigger 66. At the first A pulse following the make of circuit *d*, trigger 66 switches to Off. Trigger 66 is switched back to On at the first A pulse following the break of circuit *d*. The right output D of trigger 66 is connected to the right input of trigger 67, the left input of which is connected to the output of AND circuit $E_9$ of chain 44, to be described later. The right output of trigger 67 is connected to terminal $P_0$. The pulses produced by this trigger are used for synchronization purposes and serve particularly to start scanning chain 54.

*The scanning chain.*—Scanning chain 54 is an open chain comprising 9 triggers $B_1$ through $B_9$, and 9 AND circuits $E_1$ through $E_9$. The arrangement of this chain is the same as primary chain 52, with the difference that the output of the last AND circuit is not connected to the right input of the first trigger. It is connected, as already mentioned above, to the left input of trigger 67 of the starting device. All the triggers $B_1$ through $B_9$ normally are in the Off stable state. The switching of trigger $B_1$ to the On state is controlled by AND circuits 68 and 69. The inputs of AND circuit 68 are connected to the left outputs of triggers $B_2$ through $B_9$, and to the right output of trigger 67. In the interest of clarification a single AND circuit is shown. Actually in practice it is desirable to split it up in several smaller cooperating AND circuits. The inputs of the second AND circuit 69 are connected to the output of AND circuit 68 and to the right output of trigger $b_1$ in the primary chain. It will be recalled that this circuit produces R pulses. As a positive voltage develops in circuit $P_0$ as a result of the switching of trigger 67, the output of AND circuit 68 is positive, in fact all of the triggers $B_1$ through $B_9$ left outputs are positive since these triggers are Off stable state. At the next R pulse, a positive voltage is applied to the left input of $B_1$ causing it to switch to its On stable state, and causing the potential at its right output to rise. At the next R pulse trigger $B_1$ switches to Off and trigger $B_2$ to On through a mechanism similar to that which has been set forth in connection with primary chain 52. At each of the next succeeding R pulses the order of the trigger being On progresses by one unit. AND circuit 58 prevents switching back to On condition by reason of the fact that the low potential of the left output of the trigger which is On blocks the opening of AND circuit 58. At the A pulse, following the switching of $B_9$ to On, $B_9$ comes back to Off (all the triggers of the chain then are in Off condition), and trigger 67 which was On is switched Off.

Pulses produced on the right outputs of triggers $B_1$ through $B_9$ are connected to circuits $P_1$ through $P_9$.

*Time Diagrams*

FIG. 8 represents, during a time slightly longer than a machine cycle, the voltages in circuits $a_1$ through $a_{14}$, and also that in circuit $d$ (these circuits are shown in FIG. 6).

In FIG. 8, references $t_1$ through $t_{14}$ designate the times when cams 31 through 34 close circuits $a_1$ through $a_{14}$ (FIG. 6).

FIG. 9 represents, during a time slightly less than that of a print cycle, i.e. that time included between $t'$ and $t''$ in FIG. 8, the voltages in circuit $d$ and present at outputs R, A, B, D, $P_0$, $P_1$ through $P_9$ of the cycle divider shown in FIG. 7, as well as the differentiated signals produced by oscillator 51.

In FIG. 9, it can be seen that:

Primary chain 52, operating as a ring chain, produces pulses R, A and B which develop regularly every time oscillator 51 has produced 5 oscillations. The time duration of the individual pulses R, A or B is, therefore, equal to a period of the base oscillator.

The pulse voltage present at D (right output of trigger 66) switches to its low Off value at the first A pulse following the energization of circuit $d$ (action of AND circuit 61) and returns to its high value On at first A pulse following the break of circuit breaker 45 (action of AND circuit 62).

Voltage $P_0$ (right output of trigger 67) switches to its high value when voltage D switches to its low value.

Circuits $P_1$ through $P_9$ successively receive a pulse the duration of which is equal to that of the entire operation cycle of chain 52 (that is 5 periods of the oscillator), the pulse at $P_1$ being produced at the same time as the first R pulse following the potential rise of $P_0$ (action of AND circuit 68).

The end of pulse at $P_9$ causes the potential of $P_0$ to return to its low value (action of circuit $E_9$) and switching of trigger 67. Scanning chain 54 remains in this state for the remaining time of the print cycle.

*Thyratron Conditioning Circuits*

The thyratron conditioning circuit (FIG. 10) comprises 9 two-stage amplifiers. A single amplifier is shown in the figure, each stage thereof being an inverter. The inputs of these amplifiers are, respectively, connected to terminals $P_1$ through $P_9$. The amplifier outputs are designated $P'_1$ through $P'_9$, and the pulses produced thereat have the same sense as those transmitted through input circuits $P_1$ through $P_9$.

Circuits $P'_1$ through $P'_9$ are, respectively, connected to the inputs of thyratrons 101 to 109 (FIG. 17), to be described below.

*Scanning Block*

The scanning block serves the purpose of distributing to the elements of the first memory array the pulses produced by the pulse distributing chain.

In order to secure a better understanding of the description and operation of these circuits, it will be helpful to describe briefly the arrangement of the memory, an array of which is shown in FIG. 17.

*Memory.*—The memory is composed of 7 arrays each corresponding to one of six bits which define a character to be stored. The six bit code is comprised of two so-called zone bits (Zone 1 and Zone 2), and four binary coded-decimal bit positions 1, 2, 4 and 8. As is customary each bit, of course, is given a value of 0 or 1. Combinations of the values of the 6 bits provide for 64 different characters. An additional seventh bit position is provided for the six bit code and is known as the redundancy bit position. The redundancy or seventh bit is a checking element, the value of which is 0 or 1 according to the evenness of the number of the other elements having value 1. If the value of one of these 6 elements is modified accidentally, non-concordance of the value of the checking element is used to disclose the error. The check may be performed in the printing device and an example of such an embodiment is described in the aforesaid application for patent by H. S. Beattie et al., filed on December 23, 1955.

Each of the 7 memory arrays comprises 120 saturable magnetic cores, each having two stable states. Saturation in one direction represents value 0 and that in the other direction represents value 1. These cores are arranged in 10 rows and 12 columns in each array. Each core has two windings, respectively labeled "row winding" and "column winding." Row windings are disposed according to a serial arrangement just as are the column windings of all the cores of the same column.

Besides the aforesaid windings, the cores are, in practice, provided with additional windings used in "write" operations. These operations not coming within the scope of this invention, the windings and their associated circuits have not been shown.

In order to "read out" the information stored in any selected one of the cores, simultaneous pulses are directed into both row and column windings. Each pulse, individually, is insufficient to change the state of the core. Therefore, they have no effect on the other cores of the row and those of the column except the selected core at the particular coordinate intersection. However, the combination of the two pulses, taken in a suitable direction causes switching of the coordinately selected core to state 0 if it was in state 1, and does not change its state if it was in state 0. A common readout wire traverses all the cores. If the core, which has received the double pulse, changes its state it induces a voltage pulse in this line, and the presence of this pulse indicates that the core was in state 1 whereas the absence of pulse indicates that it was in state 0.

If the core is to be reset into its initial state rewrite pulses are directed into circuits, not shown, this operation being irrelevant to the scope of this invention.

Rows are numbered $L_0$ to $L_9$, and columns $C_0$ to $C_{11}$. Cores are numbered 0 to 119, the units digit in the number of a core being equal to the number of its row, while the tens digit corresponds to the number of its column.

Row windings are fed through ten circuits $L_0$ through $L_9$, and column windings through 12 circuits $C_0$ to $C_{11}$.

In this preferred embodiment of this invention there is a group of circuits $L_0$ through $L_9$ and $C_0$ through $C_{11}$ for every one of the 7 memory arrays, only one of which is illustrated in FIG. 17. However, it is also possible to set in series the 7 circuits corresponding to the same row or the same column in the various arrays.

*The scanning operation.*—During each print cycle it is necessary to successively read out the information in those cores corresponding to the rows of the characters which are to be printed during a printing cycle. The use of 9 typebars provides for the printing of 9 characters. During the 14 printing sub-cycles it is possible to print a total of $14 \times 9 = 126$ characters, but since memory arrays comprise 120 cores, the last typebar will not be used during the last 6 cycles.

The scanning is performed by a vertical scanning matrix and a horizontal scanning matrix.

*The vertical scanning matrix.*—The vertical scanning matrix serves the purpose of distributing pulses to the rows of the memory.

It should be noted that during each cycle, the first and sixth pulses will cause the readout of two cores placed in the same row, since their number has the same unit digit (0 and 70 at the first cycle, 1 and 71 at the second cycle). So it is for the second and seventh pulse, as also the third and the eighth. The fourth and the ninth pulse will cause at the first occurring eighth cycle readout of the cores placed in the same row. Beginning with the ninth cycle, the ninth pulse will not be transmitted.

The vertical scanning matrix is shown in FIG. 11. It comprises 14 six-contact relays. Each of the 14 relays $R_1$ through $R_{14}$ is connected to one of the circuits $a_1$ through $a_{14}$ cam-connected to the current supply during successive print sub-cycles. (See FIGS. 6 and 8). The first contact of each relay $R_{1A}$ through $R_{14A}$ controls the distribution of pulses from outputs $P_1$ and $P_6$ of scanning chain 54. (See FIGS. 7 and 9.) The second $R_{1B}$ through $R_{14B}$ controls the distribution of the pulses from outputs $P_2$ and $P_7$. The third $R_{1C}$ through $R_{14C}$ controls the distribution of pulses from $P_3$ and $P_8$. The fourth $R_{1D}$ through $R_{14D}$ controls the distribution of the pulses from $P_4$. The fifth $R_{1E}$ through $R_{14E}$ controls the distribution of the pulses from $P_5$. The sixth $R_{1F}$ through $R_{8F}$ controls the distribution of the pulses from $P_9$.

The pulses which traverse these contacts are directed into circuits $M_0$ through $M_9$ associated with vertical scanning pulse generators hereafter described with read circuits $L_0$ through $L_9$, previously mentioned. As shown in the figure these circuits M are so selected that their order is equal to the unit digit in the number of the cores to be scanned.

In order to avoid back circuits, rectifiers 71 through 76 have been inserted in the input circuits.

It should be noted that the circuits $P_4$ and $P_9$ could be connected in the same way as circuits $P_1$ and $P_6$. In this case then a switch should be inserted in circuit $P_9$ which would be opened, i.e. through cams, during cycles 9 through 14.

Also, it should be noted that the application of the pulses at the 11th cycle, being the same as at the first cycle, relays $R_1$ and $R_{11}$ could be replaced by a two-coil relay. The same combination could be applied to relays $R_2$ and $R_{12}$, $R_3$ and $R_{13}$, and $R_4$ and $R_{14}$.

*The horizontal scanning matrix.*—The horizontal scanning matrix (FIG. 12) is similar to that of the vertical scanning matrix, but since the 9 pulses are used in the scanning of the eleven columns of the arrays, the relays have 11 contacts (only the first two and the last two contacts have been represented in the figure). These contacts are connected to circuits $C_0$ through $C_{11}$ (FIG. 17), which in turn are connected to the horizontal scanning pulse generators described hereafter.

*Scanning matrix simplification.*—Hereinabove, in the preferred embodiment of the invention, the description has dealt with a structure wherein the number of print cycles and typebars is different from the number of rows and columns in the memory to be scanned. It will be apparent to those skilled in this art that in the case of 10 print cycles and 12 typebars the circuits may be simplified substantially, each row being scanned during one cycle, and each circuit in the pulse generation chain being always intended for the same column, whatever the cycle.

As a result, the vertical scanning matrix relays need have only one contact (FIG. 13) while the horizontal scanning matrix may be suppressed. As a matter of fact, it is enough to permanently connect each one of the circuits $P_1$ through $P_{12}$ to one of the circuits $C_0$ through $C_{11}$, to provide for this simplified embodiment.

*Vertical scanning pulse generator.*—These generators serve the purpose of producing, from pulses directed into lines $M_1$ through $M_9$ by the vertical scanning matrix, pulses with an amplitude, a shape, a duration and a position in time enabling data information entered in the memory to be read out correctly.

The vertical scanning pulse generator (FIG. 14) comprises for each row of the memory:

(1) An AND circuit 81, one input of which is connected to circuit 1 corresponding to the row to be scanned, the other input being connected to circuit $P_0$ from the cycle divider (FIG. 7). The potential of circuit $P_0$ is set at its high level during the part of the print cycle assigned to scanning (FIG. 9).

(2) A second AND circuit 82, one input of which is connected to the output of the preceding AND circuit, the other input being connected to circuit A of the cycle divider (FIG. 7). Circuit A transmits pulses the duration of which is equal to one-fifth of that of pulses transmitted from circuits $P_0$ to circuits *m*, the beginning of which coincides with that of the latter (FIG. 9).

(3) A distributing amplifier 83 the input of which is connected to the output of the preceding AND circuit and the output connected to all seven circuits L, corresponding to the 7 magnetic core arrays (vertical scanning circuit of the memory), corresponding to the row to be scanned.

The first AND circuit is not needed in normal operation. It serves for certain checks to be made in cycle divider operation without scanning the memory.

The second AND circuit governs the duration and position in time of the scanning pulses produced at the output of amplifier 83 and distributed among the 7 memory arrays. By way of example, FIG. 16 represents the time diagram of the scanning pulses during the 4th cycle (during which circuits $P_1$, $P_2$, $P_3$ . . . $P_9$ are connected, respectively, to circuits $M_3$, $M_7$ . . . $M_5$ through the vertical scanning matrix).

*Horizontal scanning pulse generator.*—This generator (FIG. 15) is constructed similarly to that of the vertical scanning pulse generator and operates in the same manner.

*Other scanning arrangements.*—As previously mentioned, in the present invention the memory cores comprise two windings forming a part each of a group of windings arranged in series. Without departing from the scope of the invention, it could be possible to replace that arrangement by single individual windings. The number of scanning circuits, instead of being equal to the sum of the number of rows and columns, would become equal to that of the cores, but only one scanning matrix would be needed instead of two.

Also, each core might be provided with more than two windings so that the order of the core would be defined by as many parameters as there are windings involved. All core windings corresponding to the same parameter are connected in series. The change of state of a core thus will require the development of simultaneous pulses in all the windings of this core. In this case, as many scanning matrices are needed as there are windings in each core.

*Reading and output assemblies.*—FIG. 17 shows a read device 8, a pulse amplifying and stretching device 9, and a group of thyratrons 10. It will be recalled that 7 groups of similar devices exist, each of which corresponds to one of the 7 bits which define a character. These 7 assemblies operate in a parallel fashion.

*Read devices.*—The magnetic core memory has previously been described in connection with the scanning circuits. It is sufficient to recall that through the scanning of rows and columns, and successively during the process of each print sub-cycle the 9 cores of each array which contain the bits corresponding to the characters to be printed during this cycle are scanned. This scanning is expressed in pulse trains in read lines 91 connected to the sense windings.

*Pulse amplifying and stretching devices.*—Pulses applied to lines 91 have a too low an amplitude and a too short a duration to be used directly. Pulse amplifying and stretching devices transform these into other pulses having a suitable form, duration and amplitude so that they can be applied to the output thyratrons.

In the described example, such a device comprises:

(1) An amplifier 92 with its input connected to read line 91.

(2) An AND circuit 93 which receives on one of its inputs the output pulse from amplifier 92, and on the other input pulse $P_0$ from the cycle divider (see FIGS. 7 and 9).

(3) A trigger 94 which is normally in On stable state. This trigger receives on its right input, signals from the output of amplifier 92 which switch it to Off condition, and on its left input, signals R from the print cycle divider (FIGS. 7 and 9) which switch it to On condition.

(4) An amplifier 95 which amplifies the signals produced on right output of trigger 94. Sngals developed on output circuit 96 of this amplifier are directed to the output thyratrons 101 through 109.

The same signals may be used in association with signals B from the print cycle divider (FIGS. 7 and 9) so as to cause rewriting, in the magnetic core memory of the information data erased by the reading operation. Inasmuch as the writing circuits do not form part of this invention they are not described here.

In FIG. 18 a time diagram of the signals developed during a complete scanning operation is shown. During the time that pulse $P_0$ is active the following circuits are energized: outputs R, A, $P_0$ of the print cycle divider (FIG. 7); read line 91—and it has been assumed that the 1st, 3rd, 4th and 7th cores scanned during the print cycle considered would change their state under the action of the scanning pulses; output 96 of the pulse amplifying and stretching device.

FIG. 18 also shows signals which are developed in the first three output circuits $P'_1$, $P'_2$, $P'_3$ of the thyratron conditioning circuit (FIG. 10), and it will be recalled that these signals are similar to the signals developed at outputs $P_1$, $P_2$, $P_3$ of the print cycle divider.

It will be appreciated that AND circuit 93 is not needed for normal operation. It only serves the purpose in certain check operations of scanning the memory without affecting the output thyratrons.

*Output thyratrons.*—Each of the 7 parts of the output memory comprises 9 two-grid thyratrons 101 through 109 which can be ignited only by the simultaneous occurrence of positive voltages on the two grids. One of the grids is connected to the output 96 of the pulse stretching device and the other to one of the output circuits $P'_1$ through $P'_9$ of thyratron conditioning circuit 3.

During the progress of each print cycle, the thyratrons successively receive impulses at their inputs P' and those also simultaneously receive a pulse from circuit 96. For example, in FIG. 18 of the thyratrons 101, 103, 104, 107 are ignited and will so remain ignited until the end of the print cycle. At the completion of this cycle, a cam-controlled switch, not shown in the figure, opens the anode circuit causing all the thyratrons to be extinguished.

It will be apparent that thyratrons could be replaced by any other device operable to maintain a stable state after it has been energized, i.e. transistorized amplifiers associated with hold circuits may be used.

*Operation*

The operation of the various elements of the system having been explained in connection with the description of these elements, the operation of the assembly will be described briefly hereafter. It will be assumed that power has been applied and base oscillator 51 is operating. As a result, base chain 52 also is operating and pulses R and A are being continuously produced.

*First print cycle.*—At the beginning of the first print cycle cam 31 energizes circuit *a*, then cam 45 energizes circuit *d*. At the first pulse A, AND circuit 61 switches trigger 66 to Off and the pulse developed at output D of the latter switches trigger 67 to On, whence a voltage rise is produced in circuit $P_0$.

The first time R pulse occurs following the rise in voltage $P_0$, the scanning chain starts operating. Pulses are now produced successively at outputs $P_1$ through $P_9$.

These pulses are applied simultaneously to:

(1) The horizontal scanning matrix (FIG. 11) which causes relay $R_1$ to be energized and to cause the successive production of pulses in circuits $M_0$, $M_0$, $M_4$, $M_8$, $M_2$, $M_6$, $M_0$, $M_4$, $M_8$, $M_2$. Subsequently, generators 6 operate to produce the development of shorter pulses coinciding with pulses A in circuits $L_0$, $L_4$, $L_8$, $L_2$, $L_6$, $L_0$, $L_4$, $L_8$, $L_2$, successively.

(2) The vertical scanning matrix (FIG. 12) which causes relay $R'_1$ being fed the successive development of pulses in circuits $c_0$, $c_1$, $c_2$, $c_4$, $c_5$, $c_7$, $c_8$, $c_9$, $c_{11}$, and subsequently to cause shorter pulses (coinciding with pulses A) to develop in circuits $C_1$, $C_2$, $C_4$, $C_5$, $C_7$, $C_8$, $C_9$, $C_{11}$.

As a result, all memory array cores of order 0, 14, 28, 42, 56, 70, 84, 98, 112 receive, one after the other simultaneous pulses in their two windings. Those cores which were in state 1 switch to state 0 thereby producing read out pulses in line 91, and subsequently stretched pulses in output 96 of the pulse amplifying and stretching device for the selective energization in each group of all the thyratrons which in turn serve to energize selected printing types.

At the end of pulse $P_9$ the return of trigger $B_9$ to Off condition causes trigger 67 to return to Off condition, thereafter a potential drop in circuit P. Next pulses A do not bring back trigger 67 to its On condition because cam 45 has previously cancelled voltage at *d*. The potential of P then is maintained at its low value until the end of the cycle.

The condition of the output thyratrons between the end of pulse $P_9$ and the end of the print cycle therefore defines the characters to be printed by the 9 typebars. The output circuits of these thyratrons are intended to be used by means such as is disclosed in the aforementioned patent application Serial No. 555,026 by H. S. Beattie et al.

*Second through eighth print cycle.*—The operation is similar to that of the first cycle. Scanned rows and columns being those which correspond to the make of relays $R_2$ and $R'_2$ at the second cycle, $R_3$ and $R'_3$ at the third cycle and so on.

*Ninth through fourteenth print cycle.*—The operation is similar to that of the preceding cycles, but there are only 8 cores scanned per each cycle, and thyratrons 109 of all the groups remain in Off condition.

At the end of the 9th print cycle circuits not shown bring the typebars back to their initial position and the system is ready for another machine cycle.

While there have been shown and described and pointed out the fundamental features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An electrical data information storage device which comprises, a first information data memory means comprising plural arrays of magnetic storage means where each array further comprises a plurality of coordinately arranged magnetic cores in which data in modified binary code is stored in the form of a pattern of saturated and unsaturated cores, a plurality of second memory means each of which corresponds to one of said plural arrays, horizontal scanning means common to said plural arrays and adapted to scan selected corresponding horizontal portions of each array of said first memory means, vertical scanning common to said plural arrays and adapted to scan selected corresponding vertical portions of each array of said first memory means, a plurality of reading means, one for each array, responsive to said common horizontal scanning means and to said common vertical scanning means for extracting all of the elements defining a predetermined plurality of characters in said combinational code from said selected corresponding portions of said first memory, cyclic control means, and timing generator means responsive to said cyclic control means for operating said scanning means to produce a plurality of predetermined interlaced scans of different selected portions of said first memory in successive cycles for transferring data from said first memory to said second memory.

2. The invention as claimed in claim 1, where said horizontal scanning means and said vertical scanning means each comprise separate matrices of relay operated contacts predeterminately rendered effective by said cyclic control means.

3. The invention as claimed in claim 1, where said each of said horizontal and vertical scanning means comprises a coordinate matrix of vacuum tubes predeterminately conditioned for operation by said cyclic control means and rendered effective by said timing generator means.

References Cited in the file of this patent

UNITED STATES PATENTS

| | | |
|---|---|---|
| 2,702,380 | Brustman | Feb. 5, 1955 |
| 2,708,267 | Weidenhammer | May 10, 1955 |
| 2,719,961 | Karnaugh | Oct. 4, 1955 |
| 2,739,299 | Burkhart | Mar. 20, 1956 |
| 2,764,750 | Wright et al. | Sept. 25, 1956 |
| 2,784,391 | Rajchman et al. | Mar. 5, 1957 |
| 2,802,203 | Stuart-Williams | Aug. 6, 1957 |
| 2,840,304 | Williams | June 24, 1958 |
| 2,845,609 | Newman | July 29, 1958 |
| 2,939,114 | Bobeck | May 31, 1960 |